(12) United States Patent
Brown et al.

(10) Patent No.: US 6,372,949 B1
(45) Date of Patent: Apr. 16, 2002

(54) SINGLE STAGE PROCESS FOR CONVERTING OXYGENATES TO GASOLINE AND DISTILLATE IN THE PRESENCE OF UNDIMENSIONAL TEN MEMBER RING ZEOLITE

(75) Inventors: Stephen H. Brown, Princeton, NJ (US); Doron Levin, Bala Cynwyd, PA (US); Reuel Shinnar, Great Neck, NY (US); William A. Weber, Marlton, NJ (US)

(73) Assignee: Mobil Oil Corporation, Fairfax, VA (US)

( * ) Notice: Subject to any disclaimer, the term of this patent is extended or adjusted under 35 U.S.C. 154(b) by 0 days.

(21) Appl. No.: 09/419,410

(22) Filed: Oct. 15, 1999

(51) Int. Cl.$^7$ .................................................. C07C 1/00
(52) U.S. Cl. ........................ 585/639; 585/640; 585/773
(58) Field of Search ................................ 585/639, 640, 585/733

(56) References Cited

U.S. PATENT DOCUMENTS

| | | | |
|---|---|---|---|
| 3,894,107 A | 7/1975 | Butter et al. | 260/668 R |
| 3,928,483 A | 12/1975 | Chang et al. | 260/668 R |
| 4,025,571 A | 5/1977 | Lago | 260/668 D |
| 4,423,274 A | 12/1983 | Daviduk et al. | 585/640 |
| 4,579,999 A * | 4/1986 | Gould et al. | 585/312 |
| 4,899,002 A | 2/1990 | Harandi et al. | 585/312 |
| 4,912,275 A | 3/1990 | Chang et al. | 585/408 |
| 5,177,279 A | 1/1993 | Harandi | 585/312 |
| 5,210,364 A * | 5/1993 | Barri et al. | 585/640 |

FOREIGN PATENT DOCUMENTS

JP 59204134 11/1984

* cited by examiner

Primary Examiner—Walter D. Griffin
Assistant Examiner—Tam M. Nguyen
(74) Attorney, Agent, or Firm—G. J. Hughes

(57) ABSTRACT

A process for selectively converting a feed comprising oxygenate to normally liquid boiling range $C_5+$ hydrocarbons in a single step is provided which comprises a) contacting the feed under oxygenate conversion conditions with a catalyst comprising a unidimensional 10-ring zeolite, e.g., one selected from the group consisting of ZSM-22, ZSM-23, ZSM-35, ZSM-48, ZSM-57, and ferrierite, at temperatures below 350° C. and oxygenate pressures above 40 psia (276 kPa); and b) recovering a normally liquid boiling range $C_5+$ hydrocarbons-rich product stream, e.g, gasoline and distillate boiling range hydrocarbons or $C_4$ to $C_{12}$ olefins.

16 Claims, No Drawings

SINGLE STAGE PROCESS FOR CONVERTING OXYGENATES TO GASOLINE AND DISTILLATE IN THE PRESENCE OF UNDIMENSIONAL TEN MEMBER RING ZEOLITE

FIELD OF THE INVENTION

The present invention relates to a single stage process for converting oxygenates such as methanol to gasoline and distillate, or olefins, in the presence of unidimensional ten member ring zeolites such as ZSM-22, ZSM-23 and ZSM-48.

BACKGROUND OF THE INVENTION

In order to provide an adequate supply of liquid hydrocarbons for use as synfuels or chemical feedstocks, various processes have been developed for converting coal and natural gas to gasoline, distillate and lubricants. A substantial body of technology has grown to provide oxygenated intermediates, especially methanol. Large scale plants can convert methanol or similar aliphatic oxygenates to liquid fuels, especially gasoline. However, the demand for heavier hydrocarbons has led to the development of processes for increasing the yield of gasoline and diesel fuel by multistage techniques.

Methanol is converted to gasoline employing Mobil Oil Corporation's MTG (methanol to gasoline) process. The MTG process is disclosed in the patent art, including, for example, U.S. Pat. Nos. 3,894,103; 3,894,104; 3,894,107; 4,035,430 and 4,058,576. U.S. Pat. No. 3,894,102 discloses the conversion of synthesis gas to gasoline. MTO processes provide a simple means of converting syngas to high-quality gasoline. The ZSM-5 catalyst used is highly selective to gasoline under methanol conversion conditions, and is not known to produce distillate range fuels, because the $C_{10}+$ olefin precursors of the desired distillate are rapidly converted via hydrogen transfer to heavy polymethylaromatics and $C_4$ to $C_8$ isoparaffins under methanol conversion conditions.

In order to make diesel fuel using ZSM-5 the MTO process was integrated with the MOGD process. Because the conversion of methanol to diesel with zeolites requires two steps, the Fischer Tropsch process is generally reported to be preferred for the conversion of syngas to distillates.

Recent developments in zeolite catalysts and hydrocarbon conversion processes have created interest in utilizing olefinic feedstocks, for producing $C_5+$ gasoline, diesel fuel, etc. In addition to the basic work derived from ZSM-5 type zeolite catalysts, a number of discoveries have contributed to the development of a new industrial process, known as Mobil Olefins to Gasoline/Distillate ("MOGD"). This process has significance as a safe, environmentally acceptable technique for utilizing feedstocks that contain lower olefins, especially $C_2$ to $C_5$ alkenes.

In U.S. Pat. Nos. 3,960,978 and 4,021,502, Plank, Rosinski and Givens disclose conversion of $C_2$ to $C_5$ olefins alone or in admixture with paraffinic components, into higher hydrocarbons over crystalline zeolites having controlled acidity. Garwood et al have also contributed improved processing techniques to the MOGD system, as in U.S. Pat. Nos. 4,150,062, 4,211,640 and 4,227,992. The above-identified disclosures are incorporated herein by reference.

Conversion of lower olefins, especially propene and butenes, over ZSM-5 is effective at moderately elevated temperatures and pressures. The conversion products are sought as liquid fuels, especially the $C_5+$ aliphatic and aromatic hydrocarbons. Olefinic gasoline is produced in good yield by the MOGD process and may be recovered as a product or recycled to the reactor system for further conversion to distillate-range products. Operating details for typical MOGD units are disclosed in U.S. Pat. Nos. 4,445,031, 4,456,779, Owen et al, and U.S. Pat. No. 4,433,185, Tabak, incorporated herein by reference.

In addition to their use as shape selective oligomerization catalysts, the medium pore ZSM-5 type catalysts are useful for converting methanol and other lower aliphatic alcohols or corresponding ethers to olefins. Particular interest has been directed to a catalytic process (MTO) for converting low cost methanol to valuable hydrocarbons rich in ethene and $C_3+$ alkenes. Various processes are described in U.S. Pat. No. 3,894,107 (Batter et al), U.S. Pat. No. 3,928,483 (Chang et al), U.S. Pat. No. 4,025,571 (Lago), U.S. Pat. No. 4,423,274 (Daviduk et al) and U.S. Pat. No. 4,433,189 (Young), incorporated herein by reference. It is generally known that the MTO process can be optimized to produce a major fraction of $C_2$ to $C_4$ olefins. Prior process proposals have included a separation section to recover ethene and other gases from by-product water and $C_5+$ hydrocarbon liquids. The oligomerization process conditions which favor the production of $C_{10}$ to $C_{20}$ and higher aliphatics tend to convert only a small portion of ethene as compared to $C_3+$ olefins.

The Gould et al U.S. Pat. No. 4,579,999 discloses an integrated process for the conversion of methanol to gasoline and distillate. In a primary catalytic stage (MTO) methanol is contacted with zeolite catalyst to produce $C_2$ to $C_4$ olefins and $C_5+$ hydrocarbons. In a secondary catalytic stage (MOGD) containing an oligomerization catalyst comprising medium-pore shape selective acidic zeolite at increased pressure, a $C_3+$ olefins stream from the primary stage is converted to gasoline and/or distillate liquids.

The Harandi et al U.S. Pat. No. 4,899,002 discloses a process for the increased production of olefinic gasoline conversion under moderate severity conditions. The product of the olefins to gasoline conversion is passed to an olefin to gasoline and distillate (MOGD) conversion zone for distillate production.

The methanol to olefin process (MTO) operates at high temperature and near 30 psig in order to obtain efficient conversion of the methanol to olefins. These process conditions, however, produce an undesirable amount of aromatics and $C_2$ olefins and require a large investment in plant equipment.

The olefins to gasoline and distillate process (MOGD) operates at moderate temperatures and elevated pressures to produce olefinic gasoline and distillate products. When the conventional MTO process effluent is used as a feed to the MOGD process, the aromatic hydrocarbons produced in the MTO unit are desirably separated and a relatively large volume of MTO product effluent has to be cooled and treated to separate a $C_2-$ light gas stream, which is unreactive, except for ethene which is reactive to only a small degree, in the MOGD reactor, and the remaining hydrocarbon stream has to be pressurized to the substantially higher pressure used in the MOGD reactor.

U.S. Pat. No. 5,177,279 to Harandi discloses converting methanol, dimethyl ether (DME) or the like to gasoline and distillate, in a continuous process with integration between major process units. The methanol feed is split between two major process units, with a first portion of the methanol feed being fed to the methanol to olefins unit reactor (MTO) and a second portion of the methanol feed being fed to an olefin to gasoline and distillate unit reactor (MOGD) to produce gasoline or distillate. The process uses shape-selective zeolites such as ZSM-5, ZSM-11, ZSM-12, ZSM-22, ZSM-23, ZSM-35, ZSM-38 and MCM-22. The same zeolite may be used in both process units.

Gasoline and distillate are currently the transportation fuels of choice and are currently manufactured by refining oil. Should the supply of crude oil fail to meet the demand for these transportation fuels, there will be a need to produce them from the more abundant supplies of coal and natural gas. It has long been known that these alternate feedstocks can be gasified and converted to methanol and then to gasoline over acidic, zeolite catalysts. However, a need has remained to directly convert methanol to gasoline and distillate using a zeolite catalyst. The process of the invention is first to demonstrate that such a direct conversion is possible. The ability to produce distillates directly may allow zeolite-based processes to compete better with Fischer-Tropsch for the conversion of coal and methane to synthetic distillate. It is also desirable to find a means to convert methanol directly to high yields of $C_4$ to $C_{12}$ olefins.

SUMMARY OF THE INVENTION

The present invention relates to a single step process for selectively converting a feed comprising oxygenate to normally liquid boiling range $C_5$+ hydrocarbons in a single step which comprises a) contacting said feed under oxygenate conversion conditions with a catalyst comprising a unidimensional 10-ring zeolite at temperatures below 350° C. and oxygenate pressures above 40 psia (276 kPa); and b) recovering a normally liquid boiling range $C_5$+ hydrocarbons-rich product stream.

In another embodiment, the present invention relates to a single step process for selectively converting a feed comprising oxygenate to gasoline and distillate boiling range products in a single step which comprises a) contacting said feed under oxygenate conversion conditions with a catalyst comprising a unidimensional 10-member ring zeolite, e.g., one selected from the group consisting of ZSM-22, ZSM-23, ZSM-35, ZSM-48, ZSM-57, and ferrierite, at temperatures below 350° C. and oxygenate pressures above 40 psia (276 kPa); and b) recovering a gasoline and distillate boiling range hydrocarbons-rich product stream.

In yet another embodiment, the present invention relates to a process for selectively converting a feed comprising oxygenate to $C_4$ to $C_{12}$ olefins in a single step which comprises a) contacting said feed under oxygenate conversion conditions with a catalyst comprising a unidimensional 10-ring zeolite, e.g., one selected from the group consisting of ZSM-22, ZSM-23, ZSM-35, ZSM-57, ferrierite, and ZSM-48, at temperatures below 350° C. and oxygenate pressures above 40 psia (276 kPa); and b) recovering a $C_4$ to $C_{12}$ olefins-rich product stream.

DETAILED DESCRIPTION OF THE INVENTION

Catalysts

The present invention utilizes a catalyst comprising unidimensional 10-ring zeolite, i.e., medium pore zeolite having unidimensional channels comprising 10-member rings, for selectively converting oxygenate-containing feeds to $C_5$+ hydrocarbon-rich product. Such zeolites include ZSM-22 (U.S. Pat. No. 4,481,177), ZSM-23 (U.S. Pat. No. 4,076,842), ZSM-35 (U.S. Pat. No. 4,016,245), ZSM-57 (U.S. Pat. No. 5,046,685), ferrierite, and ZSM-48 (U.S. Pat. No. 4,375,573).

In one aspect of the invention, the present invention may employ, in addition to the unidimensional 10-ring zeolite, a catalyst which employs a medium pore size zeolite having "multidimensional" or "multidimensional channels", i.e., the pores in the zeolite forming channels which do intersect each other. Examples of such zeolites include ZSM-5 (U.S. Pat. No. 3,702,886), ZSM-11 (U.S. Pat. No. 3,709,979), and MCM-22 (U.S. Pat. No. 4,304,698).

In general, the weight ratio of multidimensional medium pore size zeolite to unidimensional 10-ring zeolite ranges from 0 to 20, preferably 0.1 to 10, more preferably from 0.2 to 5. In those embodiments wherein $C_4$ to $C_{12}$ olefins-rich product stream is desired, little if any multidimensional medium pore size zeolite can be present. Accordingly, in such instances, the weight ratio of multidimensional medium pore size zeolite to unidimensional 10-ring zeolite can range from 0 to 0.3, preferably 0 to 0.1, more preferably 0.

The zeolites selected for use herein will generally possess an alpha value of at least about 1, and preferably at least 5. "Alpha value", or "alpha number", is a measure of zeolite acidic functionality and is more fully described together with details of its measurement in U.S. Pat. No. 4,016,218, J. Catalysis, 6, pp. 278–287 (1966) and J. Catalysis, 61, pp. 390–396 (1980). Variation of zeolite acidity can be achieved by a variety of techniques including (a) synthesizing a zeolite with different silica/alumina ratios, (b) steaming, (c) steaming followed by dealuminization and (d) substituting framework aluminum with other species. For example, in the case of steaming, the zeolite(s) can be exposed to steam at elevated temperatures ranging from about 500° to about 1200° F. (260° to 650° C.) and preferably from about 750° to about 1000° F. (400 to 540° C.). This treatment can be accomplished in an atmosphere of 100% steam or an atmosphere consisting of steam and a gas which is substantially inert to the zeolite. A similar treatment can be accomplished at lower temperatures employing elevated pressure, e.g., at from about 350° to about 700° F. (180 to 1290° C.) with about 1030 kPa to about 20,600 kPa. Specific details of several steaming may be gained from the disclosures of U.S. Pat. Nos. 4,325,994; 4,374,296; and 4,418,235, the contents of which are incorporated by reference herein. Aside from, or in addition to any of the foregoing procedures, the surface acidity of the zeolite(s) can be eliminated or reduced by treatment with bulky reagents as described in U.S. Pat. No. 4,520,221, the contents of which are incorporated by reference herein.

The porous crystalline material employed in the process of the invention is preferably a medium-pore size aluminosilicate zeolite. Medium pore zeolites are generally defined as those having a pore size of about 5 to about 7 Angstroms, such that the zeolite freely sorbs molecules such as n-hexane, 3-methylpentane, benzene and p-xylene. Another common definition for medium pore zeolites involves the Constraint Index test which is described in U.S. Pat. No. 4,016,218, which is incorporated herein by reference. In this case, medium pore zeolites have a Constraint Index of about 1–12, as measured on the zeolite alone without the introduction of modifiers and prior to any treatment to adjust the diffusivity of the catalyst. In addition to the medium-pore size aluminosilicate zeolites, other medium pore acidic metallosilicates, such as silicoaluminophosphates (SAPOs), can be used in the process of the invention.

Preferably, the zeolite employed in the process of the invention has a silica to alumina molar ratio of less than 2000, preferably less than 500, more preferably less than 200.

The crystal size of zeolites used herein can be less than 10 micron, preferably less than 10 micron, more preferably ranging from 0.01 to 2 micron. The accurate measurement of crystal size of zeolite materials is frequently very difficult. Microscopy methods such as Scanning Electron Microscopy (SEM) and Transmission Electron Microscopy (TEM) are often used, but these methods require measurements on a large number of crystals and for each crystal measured, values may be required in up to three dimensions. Estimates can be made of the effective average crystal size by measuring the rate of sorption of 2,2-dimethylbutane at 90EC. and 60 torr hydrocarbon pressure. The crystal size is computed by applying the diffusion equation given by J. Crank, The Mathematics of Diffusion, Oxford at the Clarendon Press, 52–56 (1957), for the rate of sorbate uptake by a solid whose diffusion properties can be approximated by a plane sheet model. In addition, the diffusion constant of 2,2-dimethylbutane, D, under these conditions is taken to be $1.5 \times 10^{-14}$ cm$^2$/sec. The relation between crystal size measured in microns, d, and diffusion time measured in minutes, $t_{0.3}$ the time required for uptake of 30% of capacity of hydrocarbon, is: $d=0.0704 \times t_{0.3}^{1/2}$. These measurements can be made on a computer controlled, thermogravimetric electrobalance, but there are numerous ways one skilled in the art could obtain the data. For example, larger crystal material used herein can have sorption time, $t_{0.3}$ of 497 minutes which gives a calculated crystal size of 1.6 microns. A sorption time for smaller crystal material 7.8 minutes yields a calculated crystal size of 0.20 micron.

The porous crystalline material employed in the process of the invention may be combined with a variety of binder or matrix materials resistant to the temperatures and other conditions employed in the process. Such materials include active and inactive materials such as clays, silica and/or metal oxides such as alumina. The latter may be either naturally occurring or in the form of gelatinous precipitates or gels including mixtures of silica and metal oxides. Use of a material which is active, tends to change the conversion and/or selectivity of the catalyst and hence is generally not preferred. Inactive materials suitably serve as diluents to control the amount of conversion in a given process so that products can be obtained economically and orderly without employing other means for controlling the rate of reaction. These materials may be incorporated into naturally occurring clays, e.g., bentonite and kaolin, to improve the crush strength of the catalyst under commercial operating conditions. Said materials, i.e., clays, oxides, etc., function as binders for the catalyst. It is desirable to provide a catalyst having good crush strength because in commercial use it is desirable to prevent the catalyst from breaking down into powder-like materials.

Naturally occurring clays which can be composited with the porous crystalline material include the montmorillonite and kaolin family, which families include the subbentonites, and the kaolins commonly known as Dixie, McNamee, Georgia and Florida clays or others in which the main mineral constituent is halloysite, kaolinite, dickite, nacrite, or anauxite. Such clays can be used in the raw state as originally mined or initially subjected to calcination, acid treatment or chemical modification.

In addition to the foregoing materials, the porous crystalline material can be composited with a porous matrix material such as silica-alumina, silica-magnesia, silica-zirconia, silica-thoria, silica-beryllia, silica-titania as well as ternary compositions such as silica-alumina-thoria, silica-alumina-zirconia silica-alumina-magnesia and silica-magnesia-zirconia.

The relative proportions of porous crystalline material and inorganic oxide matrix vary widely, with the content of the former ranging from about 1 to about 90% by weight and more usually in the range of about 2 to about 80 wt. % of the composite.

Preferably, the binder material comprises silica, alumina or a kaolin clay.

Procedures for preparing silica-bound zeolites, such as ZSM-5, are described in U.S. Pat. Nos. 4,582,815; 5,053,374; and 5,182,242. A particular procedure for binding ZSM-5 with a silica binder involves an extrusion process.

The porous crystalline material may be combined with a binder in the form of a fluidized bed catalyst. This fluidized bed catalyst may comprise clay in the binder thereof, and may be formed by a spray-drying process to form catalyst particles having a particle size of 20–200 microns.

Process Conditions

The process of the invention is preferably carried out in a moving or fluid catalyst bed with continuous oxidative regeneration. The extent of coke loading on the catalyst can then be continuously controlled by varying the severity and/or the frequency of regeneration. In a turbulent fluidized catalyst bed the conversion reactions are conducted in a vertical reactor column by passing hot reactant vapor upwardly through the reaction zone at a velocity greater than dense bed transition velocity and less than transport velocity for the average catalyst particle. A continuous process is operated by withdrawing a portion of coked catalyst from the reaction zone, oxidatively regenerating the withdrawn catalyst and returning regenerated catalyst to the reaction zone at a rate to control catalyst activity and reaction severity to effect feedstock conversion. Preferred fluid bed reactor systems are described in Avidan et al U.S. Pat. No. 4,547,616; Harandi & Owen U.S. Pat. No. 4,751,338; and in Tabak et al U.S. Pat. No. 4,579,999, incorporated herein by reference.

The use of unidimensional 10-ring zeolite has been found to provide excellent selectivity to distillate boiling range hydrocarbons, e.g., diesel fuel. Moreover, unidimensional 10-ring zeolites produce unexpectedly small amounts of aromatics under the conditions of the present invention. Accordingly, unidimensional 10-ring zeolite may be added to a fluid bed methanol-to-gasoline (MTG) process for the purpose of producing distillate as well as gasoline, while reducing aromatics content of both the gasoline and distillate boiling range hydrocarbons produced. Addition of the catalyst can be to either the MTG reactor or a separate reactor. Unidimensional 10-ring zeolite used alone under similar low temperature, high oxygenate pressure conditions has been found to produce $C_6$ to $C_{14}$ olefins which can be separated and sold as high value chemical feedstocks.

The process of the present invention is conducted at a temperature below 350° C., preferably between about 250° and about 350 ° C., most preferably between about 275° and about 340° C., an oxygenate pressure greater than 40 psia (276 kPa), preferably from 40 to 500 psia (276 to 3448 kPa), more preferably from 75 to 250 psia (517 to 1724 kPa), and a weight hourly space velocity of between 0.1 and 1000, preferably from 0.5 to 10, more preferably from 1 to 5.

The feed to the process comprises oxygenates, preferably $C_1$ to $C_3$ oxygenates, preferably an oxygenate selected from the group consisting of methanol, dimethyl ether, ethanol, and diethylether, e.g., a mixture of methanol and dimethyl ether, in combination with other feed components noted below. The process may also be conducted advantageously in the presence of $C_4$+ olefin cofeed which is added to improve selectivity to distillate. Such a cofeed can comprise a recycled cut of naphtha rich in heavy olefins such as pentenes, hexenes and heptenes; any paraffins in the recycled cut undergo further reaction much less rapidly. Moreover, a $C_4+$ olefin cofeed, e.g., octene, improves hydrocarbon selectivity to $C_6$ to $C_{14}$ olefins. Generally, oxygenate:olefin molar ratio can range from 1 to 500, preferably 10 to 200, more preferably 25 to 100.

The present process can also be carried out in the presence of hydrogen and/or added water such that the molar ratio of hydrogen and/or water to oxygenate, e.g., methanol, in the feed is between about 0.01 and about 10, preferably between 0.1 to 3.

The process of the invention can convert oxygenate-containing feed to $C_5+$ hydrocarbon-rich product which has a hydrocarbon selectivity at less than 50% oxygenate conversion of less than 30 wt. % for aromatics, greater than 40 wt. % $C_4-165°$ C. boiling range hydrocarbons (gasoline), and greater than 10 wt. % $165°$ C.$-250°$ C. boiling range hydrocarbons (distillate). Preferably at greater than 50% oxygenate conversion the $C_5+$ hydrocarbon-rich product has a hydrocarbon selectivity of less than 20 wt. % for aromatics, greater than 40 wt. % $C_4-165°$ C. boiling range hydrocarbons (gasoline), and greater than 30 wt. % $165°$ C.$-250°$ C. boiling range hydrocarbons (distillate). More preferably at greater than 50% oxygenate conversion the $C_5+$ hydrocarbon-rich product has a hydrocarbon selectivity of greater than 40 wt. % $165°$ C.$-250°$ C. boiling range hydrocarbons (distillate).

Alternatively, the process of the invention at greater than 50% oxygenate conversion can convert oxygenate-containing feed to $C_5+$ hydrocarbon-rich product which has a hydrocarbon selectivity of greater than 15 wt. %, preferably greater than 30 wt. %, more preferably greater than 60 wt. % for $C_8$ to $C_{14}$ olefins.

All of the foregoing U.S. patents are incorporated herein by reference.

The present invention will now be more particularly described with reference to the following Examples.

Experiments were conducted in a downflow fixed-bed unit in which an 18", ½" Overall Diameter (O.D.) quartz reactor with ⅛" O.D. internal quartz thermowell is centered inside a 10", single-zone furnace. Methanol and olefin feedstocks were obtained from Aldrich Chemical Company, Inc., Milwaukee, Wis. and used as received. Ditilled water was produced in-house. Feed was introduced using an Isco high pressure positive displacement pump obtained from Isco, Inc., Lincoln, Nebr. Olefins and methanol were blended in the desired molar ratio and delivered from the pump directly to a downflow, fixed bed, reactor. The unit back-pressure was controlled with a Grove Loader. Downstream of the Grove Loader the liquids and gases produced were collected and measured separately. Representative fractions of the liquid and gas produced were separately analyzed using a GC equipped with a 60-m DB Wax column obtained from J&W Scientific Incorporated, Folsom, Calif. and a flame ionization detector (FID). Hexene was used as a model cofeed.

EXAMPLE 1

A commercially available 100:1 ($SiO_2$:$Al_2O_3$) ZSM-48 catalyst that was steamed at 510° C. (950° F.) for 1 h, comprised of 65 wt % ZSM-48 having an alpha of about 25 and a n-hexane sorption of 65 mg/g, was used to convert methanol at 330° C. and 15 atm (1520 kPa). The hydrocarbon selectivity at methanol conversions above 90% is reported in Table 1 below.

EXAMPLE 2

A commercially available 100:1 ($SiO_2$:$Al_2O_3$) ZSM-48 catalyst that is steamed at 510° C. (950° F.) for 1 h, comprised of 65 wt % ZSM-48 having an alpha of about 25 and a n-hexane sorption of 65 mg/g, was used to convert a mixture of 90 wt % methanol and 10 wt % hexene (methanol:hexene molar ratio of 30:1) at 330° C. and 15 atm (1520 kPa). The hydrocarbon selectivity at complete methanol conversion is reported in Table 1 below.

TABLE 1

Methanol Conversion to Gasoline and Distillate with ZSM-48

| Hydrocarbon Selectivity (%) | Feed: 100% MeOH | Feed: 90% MeOH 10% Hexene |
|---|---|---|
| $C_1-C_3$ Hydrocarbons | 6 | 5 |
| $C_4-165$ C. (Gasoline) | 70 | 62 |
| 165° C.–250° C. (Distillate) | 24 | 33 |

Example 3 (Comparative)

A commercially available 26:1 ($SiO_2$:$Al_2O_3$) ZSM-5 catalyst that is steamed at 510° C. (950° F.) for 1 h, comprised of 65 wt % ZSM-5 having an alpha of about 100, a diffusion parameter of 1900, and a n-hexane sorption of 65 mg/g, was used to convert methanol at 300° C. and 15 atm (1520 kPa). The hydrocarbon selectivity at 25% methanol conversion is reported in Table 2 below.

Example 4 (Comparative)

A commercially available 26:1 ($SiO_2$:$Al_2O_3$) ZSM-5 catalyst that is steamed at 510° C. (950° F.) for 1 h, comprised of 65 wt % ZSM-5 having an alpha of about 100, a diffusion parameter of 3000, and a n-hexane sorption of 65 mg/g, was used to convert a mixture of 90 wt % methanol and 10 wt % hexene (methanol:hexene molar ratio of 30:1) at 300° C. and 15 atm (1520 kPa). The hydrocarbon selectivity at 50% methanol conversion is reported in Table 2 below.

TABLE 2

Methanol Conversion to Gasoline and Distillate with ZSM-5

| Hydrocarbon Selectivity (%) | Feed: 100% MeOH | Feed: 90% MeOH 10% Hexene |
|---|---|---|
| $C_1-C_3$ Hydrocarbons | 15 | 15 |
| $C_4-165$ C. (Gasoline) | 65 | 65 |
| TMB and Durene | 20 | 20 |

Table 2 shows the expected selectivities to light hydrocarbons and heavy polymethylaromatics that result from the conversion of methanol over ZSM-5 at low temperatures and elevated pressures. Both trimethylbenzene (TMB) and durene boil above 165° C. and are therefore technically distillate. These molecules have little value as either gasoline, diesel, or petrochemicals, making the conversion of methanol at these conditions highly undesirable. Addition of 10 wt% 1-hexene cofeed led to insignificant changes in the product distribution.

Table 1 demonstrates that a completely novel and unexpected product distribution is obtained at these same conditions by using unidimensional 10-ring zeolite ZSM-48. The product is rich in C9+ olefins, napthenes, and paraffins, and contains relatively small amounts of trimethylbenzenes and durene thus making it a suitable precursor for conversion to diesel fuel. Furthermore, unlike the ZSM-5 base case, addition of 1-pentene cofeed unexpectedly led to a significant increase in the selectivity to distillate.

EXAMPLE 5

A commercially available 100:1 ($SiO_2$:$Al_2O_3$) ZSM-48 catalyst that is steamed at 510° C. (950° F.) for 1 h, comprised of 65 wt % ZSM-48 having an alpha of about 25 and a n-hexane sorption of 65 mg/g, is used to convert a mixture of 90 wt % methanol and 10 wt % octene (methanol:octene molar ratio of 30:1) at 300° C. and 5 atm. The hydrocarbon selectivity to $C_8$–$C_{12}$ olefins at 50% methanol conversion is 70 wt %.

EXAMPLE 6

Equal amounts of the catalysts from examples 1 and 3 are mixed and used to convert a mixture of 90 wt % methanol and 10 wt % hexene (methanol:hexene molar ratio of 30:1) at 300° C. and 15 atm. The hydrocarbon selectivity at methanol conversions above 90% are compared with the results of example 4 in Table 3.

TABLE 3

Methanol Conversion to Gasoline and Distillate with ZSM-5/ZSM-48 Mixture

| Hydrocarbon Selectivity (%) | ZSM-5 | 50% ZSM-5 50% ZSM-48 |
|---|---|---|
| $C_1$–$C_3$ Hydrocarbons | 15 | 10 |
| $C_4$–165 C. (Gasoline) | 64 | 60 |
| TMB and Durene | 20 | 15 |
| Other C9+ | 1 | 15 |

It is claimed:

1. A process for selectively converting a feed comprising oxygenate to normally liquid boiling range $C_5$+ hydrocarbons in a single step which comprises
   a) contacting said feed under oxygenate conversion conditions with a catalyst comprising a unidimensional 10-ring zeolite and a medium pore size multidimensional zeolite at temperatures below 350° C. and oxygenate pressures above 40 psia; and
   b) recovering a normally liquid boiling range $C_5$+ hydrocarbons-rich product stream.

2. The process of claim 1 wherein said unidimensional 10-member ring-zeolite is selected from the group consisting of ZSM-22, ZSM-23, ZSM-35, ZSM-48, ZSM-57, and ferrierite.

3. The process of claim 2 wherein said medium pore size multidimensional zeolite is selected from the group consisting of ZSM-5, ZSM-11, and MCM-22.

4. The process of claim 3 wherein a weight ratio of multidimensional medium pore size zeolite to unidimensional 10-ring ranges from 0.1 to 10.

5. The process of claim 4, wherein said feed comprises $C_1$ to $C_3$ oxygenates and said contacting is carried out at a temperature between about 250° and about 350° C., an oxygenate pressure of 40 to 500 psia, and a weight hourly space velocity from 0.5 to 10.

6. The process of claim 5, wherein said feed comprises oxygenate selected from the group consisting of methanol, dimethyl ether, ethanol, and diethylether and said contacting is carried out at a temperature between about 275° and about 340° C., an oxygenate pressure of 75 to 250 psia, and a weight hourly space velocity from 1 to 5.

7. The process of claim 6 wherein said cofeed comprises a recycled cut of naphtha comprising $C_4$+ olefin selected from the group consisting of pentenes, hexenes and heptenes and said feed has an oxygenate:olefin molar ratio ranging from 10 to 200.

8. The process of claim 7 wherein said unidimensional 10-member ring zeolite comprises ZSM-48, said medium pore size multidimensional zeolite comprises ZSM-5, said oxygenate-containing feed is converted at 50% oxygenate conversion to $C_5$+ hydrocarbon-rich product at a hydrocarbon selectivity of less than 30 wt. % for aromatics, greater than 40 wt. % for $C_4$–165° C. boiling range hydrocarbons (gasoline), and greater than 10 wt. % for 165° C.–250° C. boiling range hydrocarbons (distillate), in a fluidized bed reactor.

9. A process for selectively converting a feed comprising oxygenate to gasoline and distillate boiling range products in a single step which comprises
   a) contacting said feed under oxygenate conversion conditions with a catalyst comprising a unidimensional 10-member ring zeolite selected from the group consisting of ZSM-22, ZSM-23, ZSM-35, ZSM-48, ZSM-57, and ferrierite at temperatures below 350° C. and oxygenate pressures above 40 psia; and
   b) recovering a gasoline and distillate boiling range hydrocarbons-rich product stream.

10. The process of claim 9 wherein said catalyst further comprises a medium pore size multidimensional zeolite selected from the group consisting of ZSM-5, ZSM-11, and MCM-22 and a weight ratio of multidimensional medium pore size zeolite to unidimensional 10-ring zeolite ranges from 0.1 to 10.

11. The process of claim 10, wherein said feed comprises $C_1$ to $C_3$ oxygenates and said contacting is carried out at a temperature between about 250° and about 350° C., an oxygenate pressure of 40 to 500 psia, and a weight hourly space velocity from 0.5 to 10.

12. The process of claim 11, wherein said feed comprises oxygenate selected from the group consisting of methanol, dimethyl ether, ethanol, and diethylether and said contacting is carried out at a temperature between about 275° and about 340° C., an oxygenate pressure of 75 to 250 psia (517 to 1724 kPa), and a weight hourly space velocity from 1 to 5.

13. The process of claim 12 wherein said cofeed comprises a recycled cut of naphtha comprising $C_4$+ olefin selected from the group consisting of pentenes, hexenes and heptenes and said feed has an oxygenate:olefin molar ratio ranging from 10 to 200.

14. The process of claim 12 wherein said unidimensional 10-member ring zeolite comprises ZSM-48, said medium pore size multidimensional zeolite comprises ZSM-5, said oxygenate-containing feed is converted at less than 50% oxygenate conversion to $C_5$+ hydrocarbon-rich product at a hydrocarbon selectivity of less than 30 wt. % for aromatics, greater than 40 wt. % for $C_4$–165° C. boiling range hydrocarbons (gasoline), and greater than 10 wt. % for 165° C.–250° C. boiling range hydrocarbons (distillate), in a fluidized bed reactor.

15. A process for selectively converting a feed comprising oxygenate to $C_4$ to $C_{12}$ olefins in a single step which comprises
   a) contacting said feed under oxygenate conversion conditions with a catalyst comprising a unidimensional 10-ring zeolite selected from the group consisting of ZSM-22, ZSM-23, ZSM-35, ZSM-48, ZSM-57, and ferrierite, at temperatures below 350° C. and oxygenate pressures above 40 psia; and
   b) recovering a $C_4$ to $C_{12}$ olefins-rich product stream wherein said feed comprises oxygenate selected from the group consisting of methanol, dimethyl ether, ethanol, and diethylether and said contacting is carried out at a temperature between about 250° and about 350° C., an oxygenate pressure of 40 to 500 psia, and a weight hourly space velocity from 0.5 to 10.

16. The process of claim 15 wherein said unidimensional 10-member ring zeolite comprises ZSM-48, said oxygenate comprises methanol, said $C_4$+ olefin comprises octene, and said contacting is carried out at a temperature between about 275° and about 340° C., an oxygenate pressure of 75 to 250 psia, and a weight hourly space velocity from 1 to 5.

* * * * *